Patented June 15, 1926.

1,588,468

BEST AVAILABLE COPY

UNITED STATES PATENT OFFICE.

THOMAS H. REIGHARD, OF TARENTUM, PENNSYLVANIA.

PROCESS FOR PRODUCING AN ALLOY.

No Drawing. Application filed October 24, 1922. Serial No. 596,607.

The invention relates to improvements in a ductile alloy and the process of producing the same.

It is an object of the invention to provide an alloy which is exceedingly ductile, one which is not hard and brittle so as to readily chip or break, which is one of the disadvantages the present day alloy contains.

My invention is based upon the discovery that where a flux is added to a mass of molten copper with a small quantity of aluminum, an alloy product is produced which is very tough and ductile, differing materially from the hard and brittle alloy products now manufactured.

One of the essential features of this invention resides in the introduction of a fluxing agent to the copper, the properties of which fluxing agent are set forth hereinafter.

In carrying out my process and to produce, say, 50 pounds of the ductile alloy, I take approximately 47 pounds of copper, which I subject to a temperature of 1200 degs. F. This places the copper in a molten state, and while in this condition I add approximately 10 pounds of flux thereto. The flux I employ is not a commercial product, but is a substance which I have discovered that can be manufactured from furnace slag and possesses peculiar characteristics. This substance on physical examination contains the following properties and has been found by me to be a most efficient fluxing material:

| | Per cent. |
|---|---|
| Silica ($SiO_2$) | 16.42 |
| Alumina ($Al_2O_3$) | 6.36 |
| Lime (CaO) | 22.00 |
| Magnesia (MgO) | 3.50 |
| Ferric oxide ($Fe_2O_3$) | .50 |
| Manganese oxide (MnO) | .42 |
| Sulphuric anhydride ($SO_3$) | 39.10 |
| Water ($H_2O$) | 11.54 |

The probable composition of this slag, based on this analysis, has been under chemical tests found to be as follows:

| | Per cent. |
|---|---|
| Water | 11.54 |
| Aluminum sulphate ($Al_2(SO_4)_3$) | 14.25 |
| Calcium sulphate | 49.47 |
| Silicates of calcium, aluminum, magnesium, iron, manganese | 24.58 |
| | 99.84 |

The foregoing slag may be prepared in the following manner:

For instance, I may mix with one pound of oil of vitriol or sulphuric acid approximately 25 pounds of furnace slag whereupon this material is mixed with 10 pounds of boiling water. The material is thoroughly heated for a period of six hours after which the water is drawn off and a product forming this substance is produced. The product is generally of a light, crumbling nature, and when analyzed contains ingredients hereinabove set forth.

This slag has been found by me to have a very peculiar action upon the molten copper, and I wish it to be understood that in using other types of known fluxing material no successful results can be obtained. When the fluxing material is added in the proportion mentioned, I then add about 2 pounds of aluminum, the mixture at this time being at a temperature of approximately 800 degs. F. and cherry red. I then spark the mass by inserting into the cherry red material a red hot iron rod, the spark causing the temperature of the mass to rise to a point above 3000 degs. F. This I attribute to the consumption of some of the aluminum in the material.

After the material has been thus treated, I discharge the same into a mold or the like, where it cools and hardens. After such cooling and to cause the ductile bronze product recovered to settle, I take the cooled material and again subject it to a melting temperature, after which it is cooled and then melted into desired forms or into ingots for future treatment and use. For some reason, I have discovered that the treated material must first be allowed to cool and thereafter again melted if the most desirable ductile product is to be obtained.

The product made in accordance with this process is one which is highly ductile, and by varying the amount of aluminum and slag the toughness or the ductility of the product must also be varied. That is to say, if I add less aluminum, the product will more closely resemble the present-day bronze in view of the fact that it is hard and brittle. As the aluminum and the flux increases, the product becomes more ductile. Upon analysis, the product has been found to contain the following essential components in substantially the percentages given. It is these components of the product that give the same its decided advantages.

| | Per cent. |
|---|---|
| Copper | 87.03 |
| Silicon | .38 |
| Aluminum, approximately | 2.15 |
| Manganese | .07 |

Having thus described my invention, what I claim is:

1. The process of producing a ductile alloy, which comprises melting a supply of copper, in adding thereto a fluxing agent manufactured from furnace slag, in then applying aluminum to said material, in inserting within the aluminum and slag a sparking implement while said material is in a heated condition to generate heat to materially raise the temperature of the molten mass, and in thereafter allowing said mass to cool to form a ductile alloy.

2. The process for producing a ductile alloy, which consists in melting a supply of copper, in adding thereto while in a molten condition a fluxing agent obtained from the manufacture of furnace slag, in then introducing aluminum while the mass is in a substantially cherry red condition, sparking the same to cause combustion in the aluminum and of materials in the slag to raise the temperature of the molten mass, and in thereafter melting and recovering the ductile alloy produced.

In testimony whereof I affix my signature.

THOMAS H. REIGHARD.